United States Patent [19]
King

[11] 3,767,985
[45] Oct. 23, 1973

[54] ACTUATOR ASSEMBLY
[75] Inventor: Dallas E. King, Dayton, Ohio
[73] Assignee: General Motors Corporation, Detroit, Mich.
[22] Filed: Nov. 20, 1972
[21] Appl. No.: 308,279

[52] U.S. Cl. .................... 310/83, 74/424.6, 310/80
[51] Int. Cl. ............................................. H02k 7/06
[58] Field of Search ..................... 310/50, 80, 83; 74/33, 89.17, 424.6

[56] References Cited
UNITED STATES PATENTS
3,280,509  10/1966  Werner .......................... 74/424.6
2,641,468  6/1953  Jacbson ........................ 310/83 UX Primary Examiner—J. D. Miller
Assistant Examiner—Harry E. Moose, Jr.
Attorney—W. S. Pettigrew et al.

[57] ABSTRACT

In a preferred form, this disclosure relates to an actuator assembly for moving a pivotally supported member in opposite directions between first and second positions. The actuator assembly includes a reversible electric motor means having an armature shaft for rotating a worm about its longitudinal axis, a guide means having an opening therein for receiving the worm, a rack supported and guided by the guide means for linear movement in opposite directions and which is in meshed engagement with the worm and operatively connected with the member to be moved. The rack includes first and second resilient arm means which are flexible in directions laterally of the path of movement of the rack and normal to each other so that flexibility is provided in two directions as the rack is linearly moved to pivotally move the member between its positions.

3 Claims, 4 Drawing Figures

PATENTED OCT 23 1973 3,767,985

ACTUATOR ASSEMBLY

This invention relates to an actuator assembly, and in particular to an actuator assembly for moving a pivotally supported member through an arcuate path between first and second positions.

Power driven actuators are commonly used in automotive vehicle applications to move various components in opposite directions between two different positions. One type of commonly used power driven actuator is a vacuum motor having a flexible diaphragm. These vacuum motors are often used for actuating pivotally supported valves in vent ducts of an air conditioning system for an automotive vehicle. In this type of application, the flexible diaphragm is pivotally connected to the valve by a rod. The advantages of this kind of vacuum motor are that due to the flexibility of the diaphragm, the member can be pivotally moved through an arcuate path and that manufacturing tolerances and alignment problems between the valve and motor when the latter is mounted to the vehicle are not critical. The latter two advantages enable the vacuum motor to be made very economically.

The present invention provides a novel power driven actuator assembly in which a reversible electric motor means and rack and worm drive are used. This actuator assembly has the same advantages as the vacuum motor actuators in that it can be used to move members through an arcuate path and that manufacturing tolerances and alignment problems are not critical.

Accordingly, an important object of the present invention is to provide a new and improved power driven actuator assembly for moving a member, such as a pivotally supported member, between first and second positions and which includes a reversible electric motor means for rotating a worm in meshed engagement with a rack supported for linear movement in opposite directions and in which the rack is of a construction and arrangement such that different parts thereof can be flexed in two different directions normal to each other so that the linearly movable rack can be used to move a member through an arcuate path and so that tolerance variations and alignment problems between the assembly and member to be moved are not critical.

Another object of the present invention is to provide a new and improved actuator assembly, as defined in the next preceding object, and in which the worm is rotatably received within the opening in a guide means and the rack is supported and guided by the guide means for linear movement in opposite directions, and in which the rack includes a first elongated resilient arm means which is self-biased toward a position in which the arm means extends parallel to the axis of rotation of the worm, but which is flexible to allow movement laterally of the axis of rotation of the worm and a second resilient arm means integral with the first arm means and which is self-biased toward a position in which it extends parallel to the axis of rotation of the worm, but is movable laterally of the axis in a direction substantially normal to the movement of the first arm means so that the two resilient arm means provide flexibility in two directions as the rack is linearly moved to move the member between its positions.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

The present invention provides a novel actuator assembly 10 for use in moving a member, preferably a component of an automotive vehicle, between first and second positions. Although the novel actuator assembly 10 could be used in various vehicular applications as well as other applications for moving a member between two positions, it will be herein described, for the purposes of illustration, as being used to move a valve member 12 of a duct arrangement 14 of an air conditioning system of an automotive vehicle (not shown).

Figure 1:
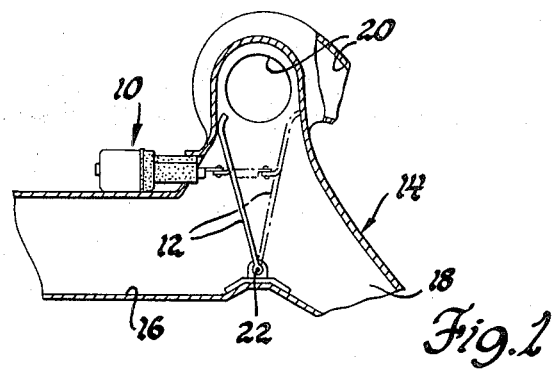
FIG. 1 is a schematic view of an air duct arrangement embodying the novel actuator assembly of the present invention.

As best shown in FIG. 1, the duct arrangement includes first and second ducts 16 and 18 which are adapted to be respectively connected to an outside vent for the vehicle and the interior compartment of the vehicle (not shown). The duct arrangement 14 further includes a third duct 20 which is joined to the adjacent ends of the ducts 16 and 18. Communication between the ducts 16 and 20 and 18 and 20 is controlled by the valve member 12. The valve member 12 is pivotally supported adjacent its lower end by a pivot pin means 22 and is movable through an arcuate path between a first position, as shown by the solid lines in FIG. 1, in which it blocks communication between ducts 16 and 20 and opens communication between ducts 18 and 20 and a second position, as shown by the dotted lines in FIG. 1, in which it blocks communication between ducts 18 and 20 and opens communication between ducts 16 and 20.

The valve member 12 is adapted to be moved between its positions by the novel actuator assembly 10 of the present invention. The actuator assembly 10 broadly comprises a reversible electric motor means 30 having a rotatable armature shaft 31, a guide means 32 secured to the electric motor means 30, a worm 34 which is drivingly connected with the armature shaft 31 and supported by the guide means 32 for rotation about its axis 34a, and a rack gear 36 which is in meshed engagement with the worm 34 and slidably guided by the guide means 32 for linear movement in opposite directions parallel to the axis of rotation of the worm 34. The rack gear 36 is adapted to be suitably secured to the valve member 12.

Figure 2:
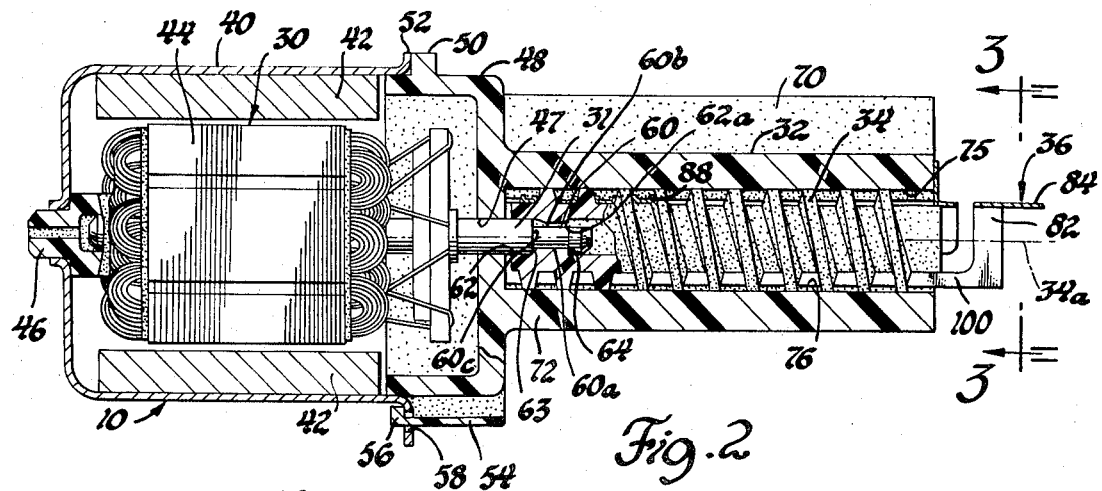
FIG. 2 is an enlarged axial cross sectional view, with portions shown in elevation, of the novel actuator assembly of the present invention.

The reversible electric motor means 30 is preferably of the permanent magnet type and includes a motor housing 40 which carries on its interior surface a plurality of circumferentially spaced permanent magnets 42 and which supports one end of a rotatable armature 44. The armature 44 is drivingly connected with the armature shaft 31 and the armature shaft 31 has one end rotatably supported in a bearing 46 carried by the housing 40 and its other end extending through an opening 47 in a cup shaped portion 48 of the guide means 32. The area of a cup shaped portion 48 defining the opening 47 serves as a bearing for the right end of the armature shaft, as viewed in FIG. 2.

The cup shaped end portion 48 of the guide means 32 is secured to and forms an end cap for the motor housing 40. To this end, the cup shaped portion 48 has an annularly radially extending flange 50 which abuts a radially extending flange 52 on the motor housing 40 and also has a plurality of axially extending flexible fingers 54 having hooked end portions 56 which are adapted to be snap fittingly received within openings 58 in the motor housing 40. This securely retains the end cap to the housing 40.

The armature shaft 31 is drivingly connected to the worm 34, the latter being made from a suitable plastic material. To this end, the armature shaft 31 has a forward non-circular end portion 60 having a rounded side wall surface 60a, a chordially extending or flat side wall surface 60b and a circumferentially and radially inwardly extending groove 60c. The worm 34 has a central opening 62 including a non-circular opening portion 62a shaped complementary with the non-circular end portion 60. The opening portion 62a is defined by radially inwardly extending shoulder portions 63 and 64 integral with the worm 34. The forward portion 60 of the armature shaft 31 is snap-fittingly received within the complimentary shaped opening portion 62a of the worm 34. The plastic material of the worm 34 is sufficiently flexible to enable the end portion 60 to be inserted or forced through the opening portion 62a and with the shoulder 64 being received within the groove 60c of the end portion 60 of the armature shaft 31. Movement of the worm 34 axially relative to the armature shaft 31 is prevented by the shoulder 64.

The worm 34 is rotatably supported by the guide means 32 for rotation about its axis 34a. To this end, the guide means 32, besides the cup shaped portion 48, includes elongated upper and lower axially extending portions 70 and 72. The portions 70 and 72 are spaced from each other and generally define an elongated axially extending opening 73 therein, which opening extends from the right end of the portions 70 and 72 to the bottom of the cup shaped portion 48, as viewed in FIG. 2. The elongated opening 73 includes arcuate recess portions 75 and 76 formed in the upper and lower members 70 and 72 for rotatably receiving the worm 34. The portions 70 and 72 defining the recesses 75 and 76 provide a guide means for rotatably supporting the worm 34 for rotation about its axis 34a.

Figure 4:
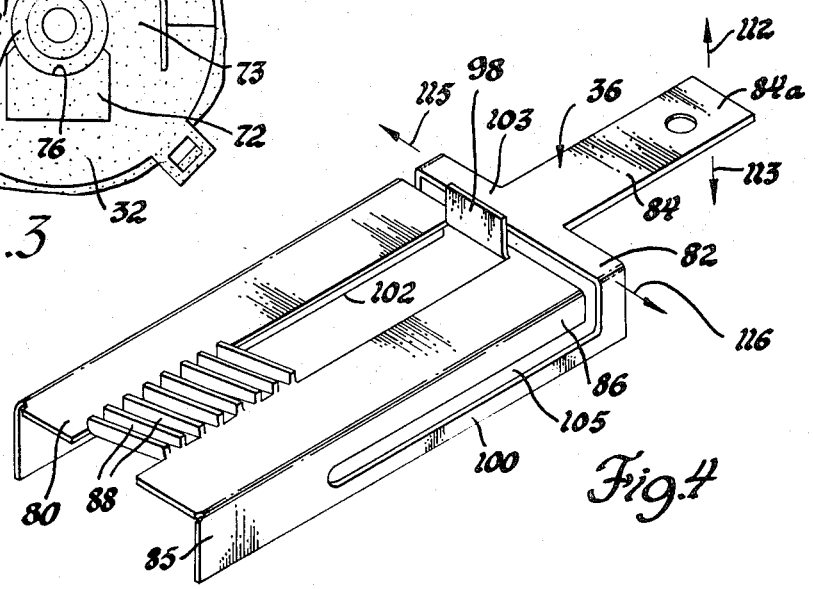
FIG. 4 is a perspective view of part of the actuator assembly shown in FIG. 2.

The guide means 32 also supports and guides the rack 36 for linear movement in opposite directions parallel to the axis of rotation 34a of the worm 34. As best shown in FIG. 4, the rack 36 is made from spring steel and includes a substantially rigid main body section 80, a first resilient arm section 82 and a second resilient arm section 84. The main body section 80 is of an inverted rectangular channel shape, as viewed in cross section, and has a rearward portion 85 and a forward portion 86. The rearward portion 85 of the body section 80 of the rack 36 is lanced and bent, as shown in FIG. 4, to provide a plurality of alternately spaced rack teeth 88. The rack teeth 88 are in meshed engagement with the teeth on the worm 34.

Figure 3:
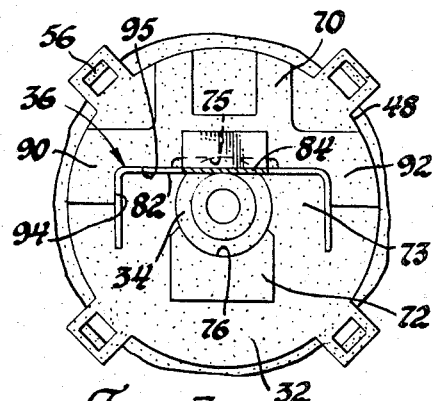
FIG. 3 is an end elevational view looking in the direction of the arrows 3—3 of FIG. 2.

The body portion 80 of the rack is slidably guided by the upper portion 70 of the guide means 32. As best shown in FIG. 3, the upper guide means 70 include L-shaped flanges 90 and 92 which slidably receive the body portion 80 along its sides 94 and its bottom 95 adjacent the ends of the rack teeth 80. The flanges 90 and 92 thus slidably support the rack 36 for linear movement in opposite directions parallel to the axis of rotation 34a of the worm 34. An upwardly extending flange or stop 98 limits movement of the rack 36 toward the left, as viewed in FIG. 2.

The resilient arm section 82 comprises a pair of spaced, thin, flat arms 100 and 102 which are integral on one end with the rearward portion 85 of the body section 80 and which are integral with a transverse bridge portion 103 at their other end. The arms 100 and 102 and the bridge portion 103 are formed by lancing out a U-shaped slot in the forward portion 86 of the body section 80 and then folding the rack 36 to the position shown in FIG. 4. When in the latter position, the slot 105 extends parallel with the forward portion 86 of the body section 80 and then downwardly to its bottom 95 and then across its bottom 95. Thus, the arms 100 and 102 overlie the sides 94 of the forward portion 86 of the body section 80 and the arms 100 and 102 define a resilient yoke which can be flexed about the left end of the arms 100 and 102, as viewed in FIG. 4. The arms 100 and 102 can be flexed in unison in opposite directions laterally of the axis of rotation of the worm 34, as indicated by the arrows 112 and 113 in FIG. 4. The resilient arm section 82 is self-biased toward a position in which the arms 100 and 102 extend parallel to the axis of rotation of the worm 34. Movement of the resilient arm section 82 in the direction of either arrow 112 or 113 relative to the guide means 32 is permitted through the space 105 between the portions 70 and 72 of the guide means 32.

The resilient arm section 84 comprises a flat, thin planar member which is integral with the center of the bridge 103 of the resilient arm section 82 and whose free end 84a is adapted to be suitably connected to the valve member 12. The arm 84 is self-biased toward a position in which it extends parallel to the axis of rotation of the worm 34. The resilient arm section 84 can be flexed or moved in opposite directions laterally of the axis of rotation of the worm 34 and in a direction normal to the direction of movement of the resilient arm section 82. This movement is indicated by the arrows 115 and 116.

From the foregoing, it should be apparent that when the electric motor means 30 is energized, the worm 34 is caused to be rotated which in turn causes the rack 36 to be linearly moved. It should also be apparent that since the valve member 12 moves in an arcuate path between its positions, that the resilient arm section 84 will be flexed from its normal position in which it lies parallel to the axis of rotation of the worm 34 so as to accomodate the arcuate movement of the valve member 12. Likewise, should the point of connection between the resilient arm section 84 and the valve member 12 be misaligned with respect to the axis of rotation of the worm 34, the resilient arm sections 82 will flex laterally in the direction of the arrow 112 or 113 to accomodate for any misalignment of rotating worm 34 and the valve member 12.

The advantages of the novel actuator assembly 10 is that the linearly movable rack 36 can be used to move members through an arcuate path and that it is automatically self-compensating for a wide range of dimensional differences or tolerance variations in the manufacture of the parts.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An actuator assembly for moving a member, such as a component of an automotive vehicle, between first and second positions comprising:
    a reversible electric motor means having an armature shaft for rotating a worm about its axis;
    a guide means having an opening therein which receives said worm;
    a rack guided by said guide means for linear movement in opposite directions and which is in meshed engagement with said worm;
    said rack including a first elongated, resilient arm means which is self-biased toward a position in which it is substantially parallel to the axis of rotation of said worm and which can be flexed in opposite directions transverse to said axis;
    and a second resilient arm means integral with said first arm means and extending forwardly therefrom and which is self-biased toward a position in which it extends parallel to the axis of rotation of said worm, said second resilient arm means being flexible in opposite directions which are substantially normal to the directions of flexure of said first arm means,
    said second arm means being adapted to be connected with the movable member and said first and second arm means providing flexibility in two directions substantially normal to each other as said rack is linearly moved to move the member between its positions.

2. An actuator assembly for moving a pivotably supported member, such as a component of an automotive vehicle, through an arcuate path between first and second positions comprising:
    a reversible electric motor means having an armature shaft;
    an elongated guide means having an elongated opening therein;
    a worm driven by said armature shaft, said worm being rotatable about its axis and guidably received by said guide means;
    a one-piece rack made from spring steel and comprising a main body section slidably guided for linear movement in opposite directions by said guide means, a first resilient arm section and a second resilient arm section,
    said main body section being substantially rigid and channel shaped as viewed in cross section and having a forward portion and a rearward portion, said rearward portion being lanced and bent to define a plurality of spaced rack teeth which are in meshed engagement with said worm, said first resilient arm section comprising a pair of spaced resilient arms which are integral with the rearward portion of said main body section and which are self-biased toward a position in which they extend substantially parallel to the axis of rotation of said worm, said pair of arms of said first resilient arm section being integral with each other adjacent their ends remote form the rearward portion of the body section and being resiliently movable in opposite directions laterally of the axis of rotation of the worm, said second resilient arm section comprising a resilient arm which is integral with the remote ends of said pair of arms of said first arm section and which is self-biased toward a position in which it extends substantially parallel to the axis of rotation of said worm, said arm of said second resilient arm section being movable in opposite directions laterally of the axis of rotation of the worm and in a direction normal to the direction of flexure of said arms of said first resilient arm section, said second arm being operatively connected with said pivotal member and said first and second resilient arm sections providing flexibility in two directions as said rack is linearly moved to pivot the member between its positions.

3. An actuator assembly for moving a member, such as a component of an automotive vehicle, between first and second positions comprising:
    a reversible electric motor means having an armature shaft;
    an elongated guide means having first and second spaced portions defining an elongated opening, a worm rotated about its axis by said armature shaft and which is guidably received between said first and second portions of the guide means,
    a one-piece rack made from a spring steel and comprising a main body section slidably guided for linear movement in opposite directions by said first portion of said guide means, a first resilient arm section and a second resilient arm section, said main body section being substantially rigid and channel shaped as viewed in cross section, said body section along its bottom being lanced and bent to define a plurality of spaced rack teeth which are in meshed engagement with said worm, said first resilient arm section comprising a pair of spaced resilient arms which are integral with the body section and which are self-biased toward a position in which they extend substantially parallel to the axis of rotation of said worm, said pair of arms of said first resilient arm section being integral with each other adjacent their ends remote from the body section via a bridge portion and being resiliently movable in opposite directions laterally of the axis of rotation of the worm, said second resilient arm section comprising a resilient arm integral with the bridge portion of said arms of said first resilient arm section and which is self-biased toward a position in which it extends substantially parallel to the axis of rotation of the worm, said arm of said second resilient arm section being movable in a direction laterally of the axis of rotation of the worm and normal to the direction of movement of said arms of said first resilient arm section, said second resilient arm section being operatively connected with said member and said first and second resilient arm sections providing flexibility in two directions as said rack is linearly moved to move the member between its positions.

* * * * *